Sept. 23, 1930.   W. V. McGUINNESS ET AL   1,776,697
MULTIPLE SENDING AND RECEIVING DEVICE FOR PNEUMATIC TUBE SYSTEMS
Filed Nov. 26, 1929   5 Sheets-Sheet 3

INVENTORS
W. V. McGuinness,
J. M. Chulstrom,
W. H. Francis,
By Eugene C. Brown
ATTORNEY Sept. 23, 1930. W. V. McGUINNESS ET AL 1,776,697
MULTIPLE SENDING AND RECEIVING DEVICE FOR PNEUMATIC TUBE SYSTEMS
Filed Nov. 26, 1929 5 Sheets-Sheet 4
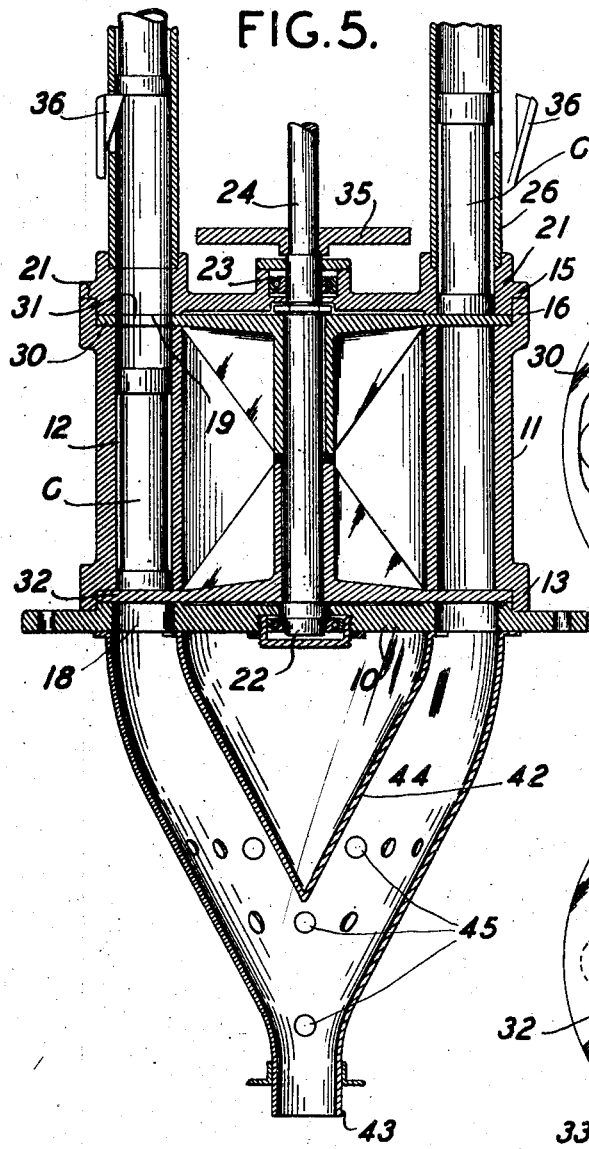
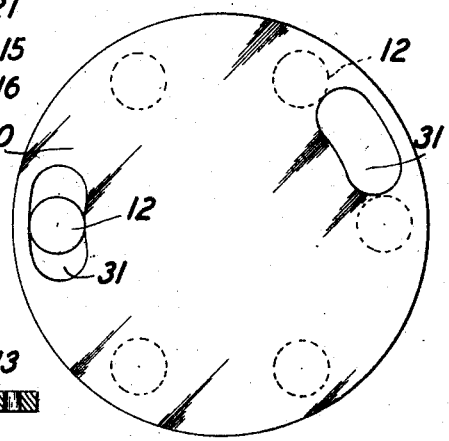
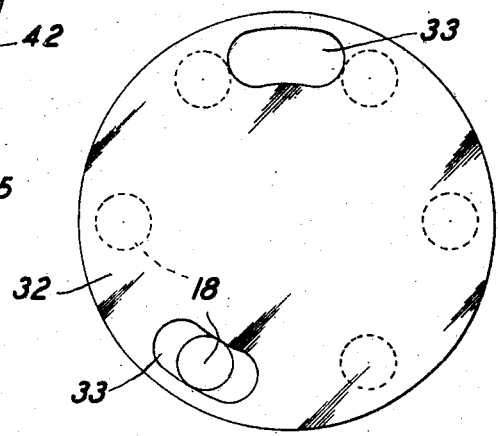
INVENTORS
W. V. McGuinness,
J. M. Chulstrom,
W. H. Francis,
By Eugene E. Brown
ATTORNEY

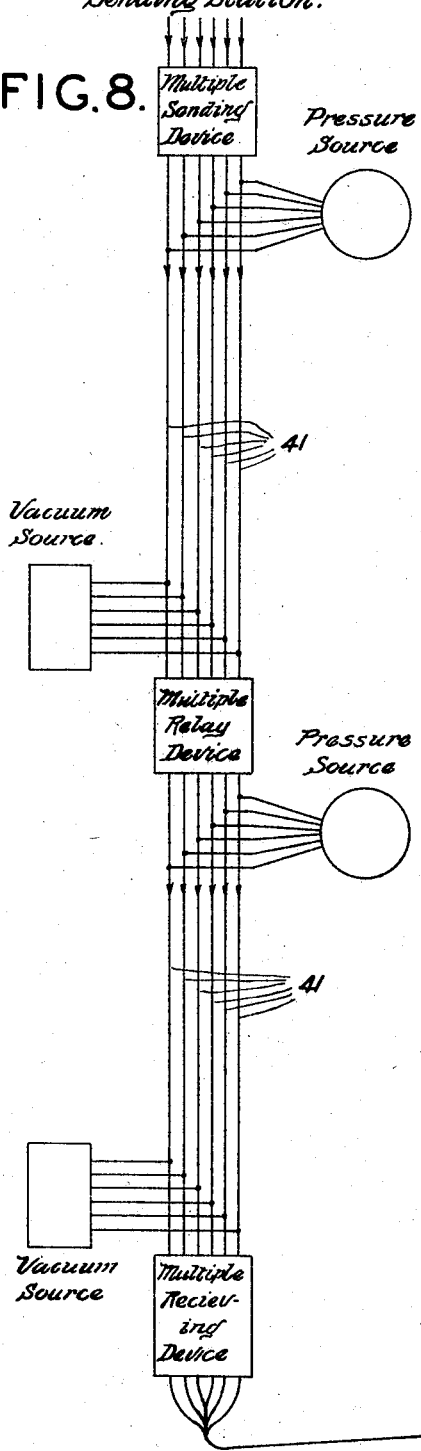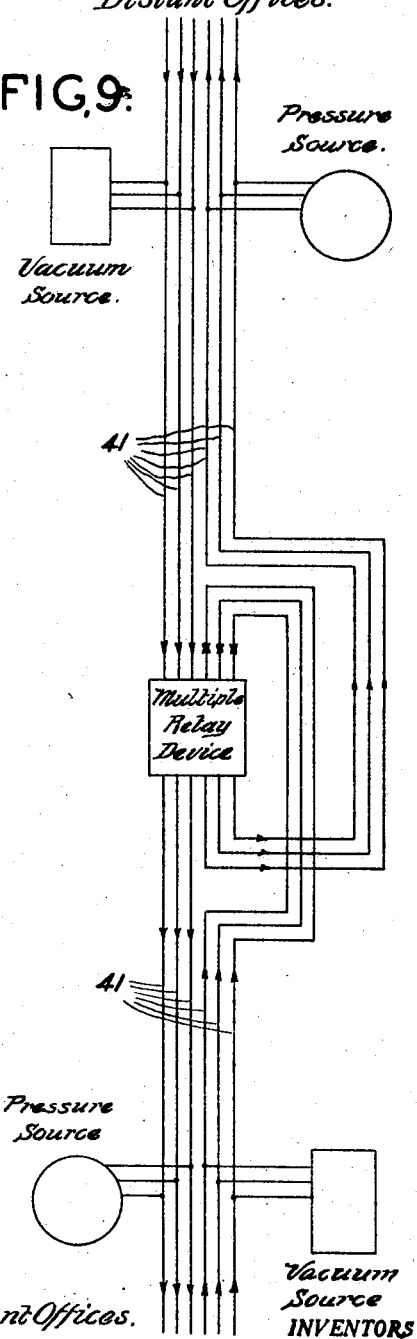

Patented Sept. 23, 1930

1,776,697

UNITED STATES PATENT OFFICE

WILLIAM V. McGUINNESS, OF FLUSHING, AND JOHN M. CHULSTROM, OF ELMHURST, NEW YORK, AND WILLIAM H. FRANCIS, OF JERSEY CITY, NEW JERSEY, ASSIGNORS TO THE WESTERN UNION TELEGRAPH COMPANY, OF NEW YORK, N. Y., A CORPORATION OF NEW YORK

MULTIPLE SENDING AND RECEIVING DEVICE FOR PNEUMATIC-TUBE SYSTEMS

Application filed November 26, 1929. Serial No. 409,898.

This invention relates to pneumatic tube systems and has special reference to a pneumatic tube employing carriers and arranged to move the carriers over a selected path automatically.

In the use of systems of this character it frequently happens that the carriers are deposited in the system at more or less close intervals. Through various causes, such as inequality in the fit of the carriers in the tubes, escape of air around the carriers and other causes, some carriers tend to travel through the tubes more rapidly than others. This is apt to cause bunching up of the carriers and blocking of the tube through which they are moving. Moreover this bunching of the carriers tends to interfere with the action of the relay described in the patent to W. V. McGuinness et al, No. 1,733,026, issued October 22, 1929.

Again it is sometimes desirable that carriers received from a number of sending points or stations should be collected at a suitable collecting or gathering station and caused to travel from that station to their destination through a single tube. Obviously, jamming of such carriers together at the gathering station by two carriers moving to enter the single tube at the same time will interfere with the proper operation of the system.

The foregoing being the case the invention has for some of its objects the provision of an automatic spacing device, for a system of this character, wherein carriers travelling through the tubes of the system will be fed into these tubes at spaced time intervals of never less than a predetermined value so that the carriers in their passage through the tubes will be so spaced that the usual variations in speed will be insufficient to cause gathering of any of the carriers together; the provision of a novel automatic spacing device whereby carriers may be gathered from tubes leading from several stations or from several tubes leading from one station and delivered to a single tube at spaced time intervals; and to provide an automatic spacer of this character so arranged as to be capable of use at the sending station, at such a relay as is set forth in the patent aforesaid and at a gathering or junction point or station.

With the above and other objects in view the invention will now be described in detail and then specifically claimed reference being had to the accompanying drawings, wherein:—

Figure 5 is a vertical section through a terminal or junction station showing the use of the invention in such a place.

Figure 6 is a diagram illustrating the action of the upper spacer plate of the invention.

Figure 7 is a diagram illustrating the action of the lower spacer plate thereof.

Figure 8 is a diagram of a piping system for this invention, the diagram being indicative of a system wherein carriers are gathered from a number of tubes into a single tube.

Figure 9 is a view similar to Fig. 8 showing a piping arrangement suitable for use with this invention in transmitting carriers to and fro between a plurality of stations each of which constitutes both a sending and a receiving station.

Figure 1:
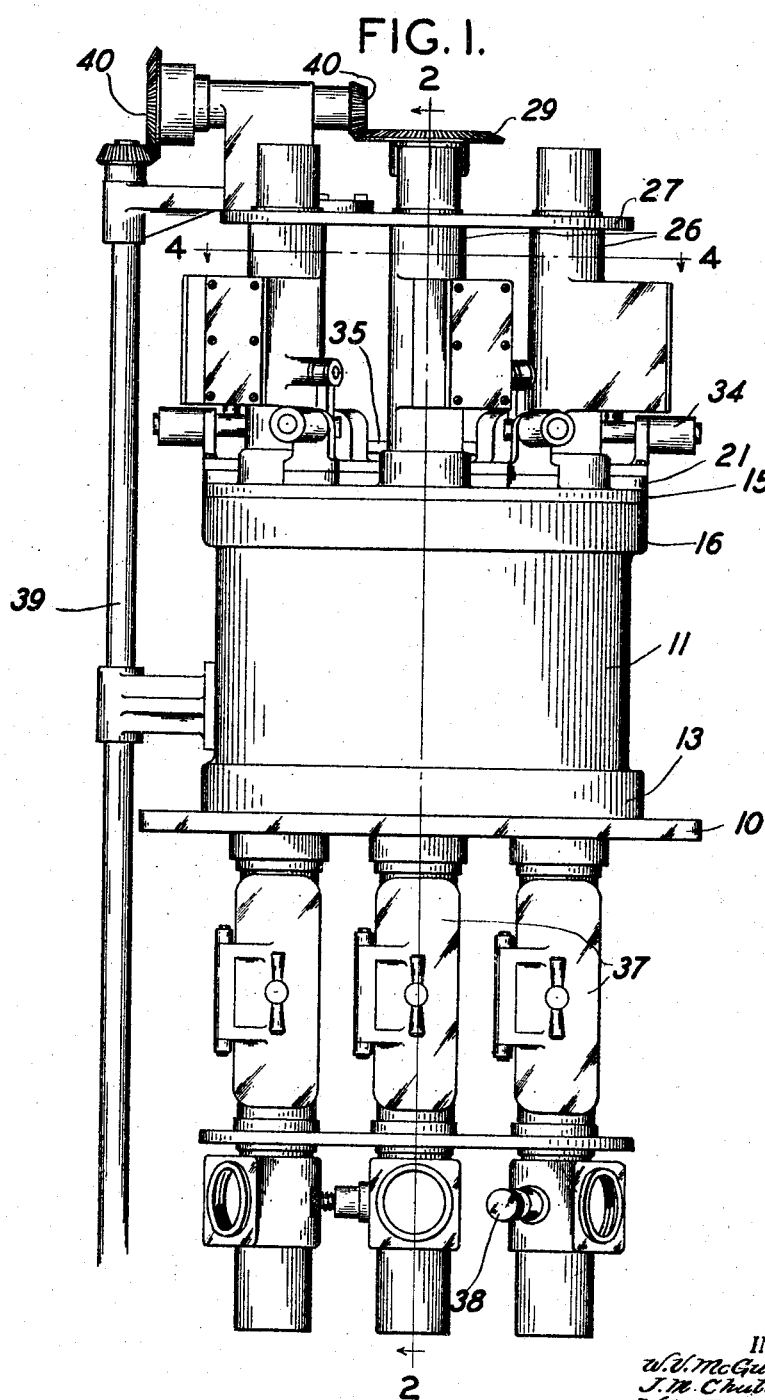
Figure 1 is a side elevation of the apparatus as arranged at a sending station.

In Figures 1 to 4 inclusive one arrangement of the device is shown, the arrangement being especially adapted for use at a sending station. In this arrangement, as well as in others, the multiple unit or valve receives carriers from a series of intake tubes and delivers them to a corresponding series of outlet tubes equal in number to and alined respectively with the intake tubes so that carriers entering through an inlet tube are delivered through the alined outlet tube. As here shown this unit or valve consists of a bottom plate 10 whereon is mounted a hollow cylinder 11 having a thick wall provided with a series of circularly spaced cylindrical passages or bores 12. This cylinder is provided at its bottom with a peripheral downwardly extending flange 13 resting in the plate 10 so that the lower ends of the bores 12 are spaced above the annular boss 14 formed on the plate 10. Above the cylinder 11 is a top plate 15 supported on an upwardly extending peripheral flange 16 formed on the cylinder 11 so that the annular boss 17 on the under side of plate 15 is spaced above the upper ends of the bores 12. Through the plate 10 extend openings 18 axially alined with but of slightly greater diameter than the bores 12. Similarly, the plate 15 is provided with openings 19, the openings 18 being continued through downwardly extending bosses 20 and the openings 19 being continued through upwardly extending bosses 21, the bosses 20 and 21 being formed on respective plates 10 and 15.

Figure 2:
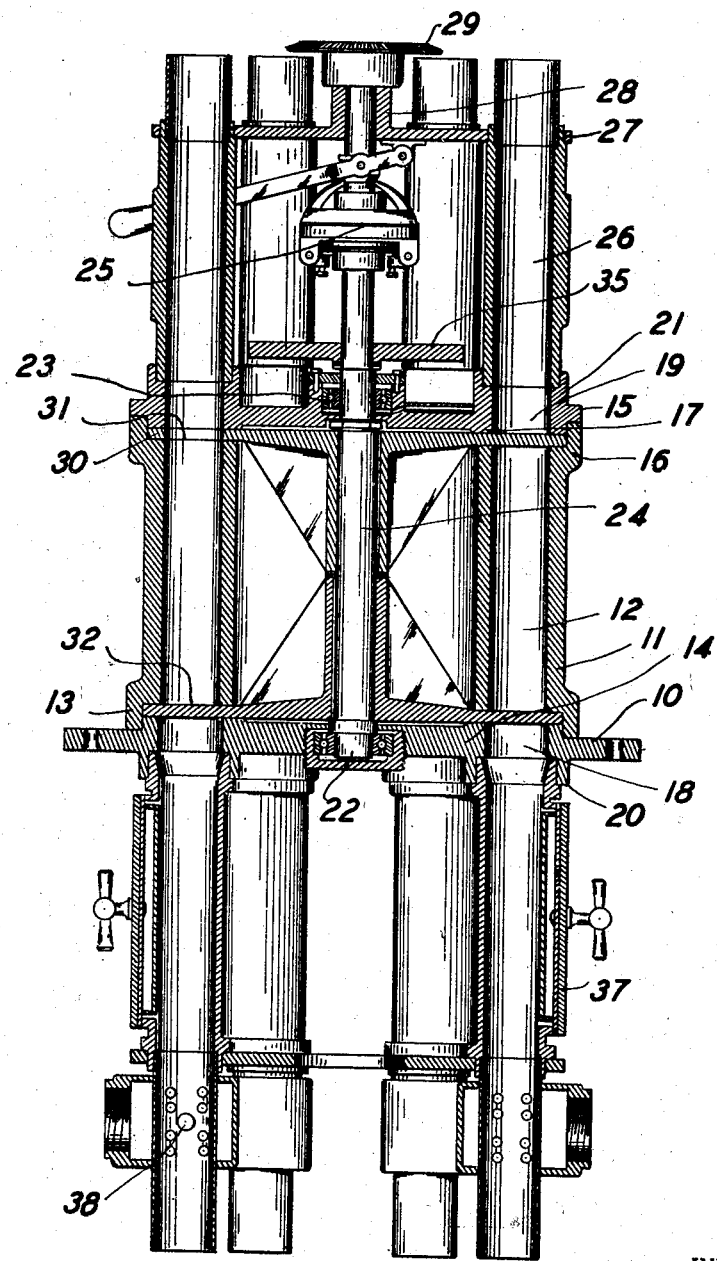
Figure 2 is a section on the line 2—2 of Fig. 1, certain gearing and other parts being omitted.
Figure 3:
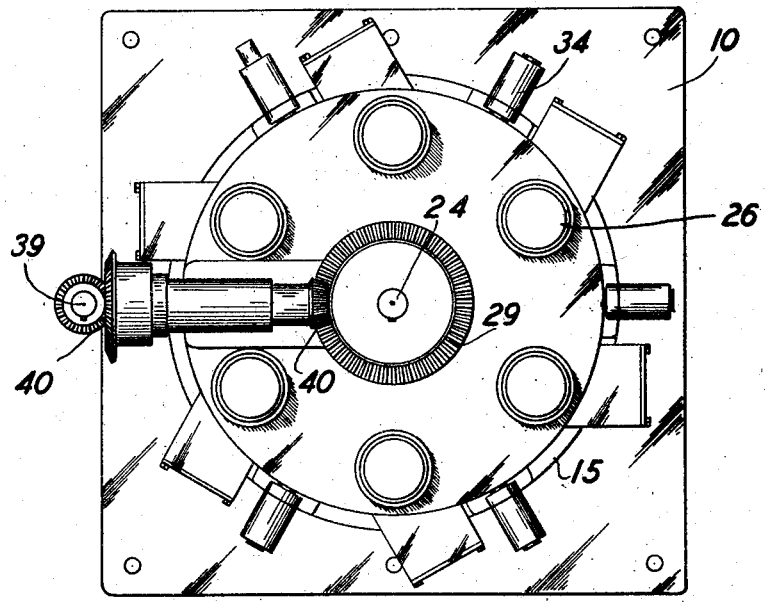
Figure 3 is a plan view of the apparatus arranged as in Fig. 1.
Figure 4:
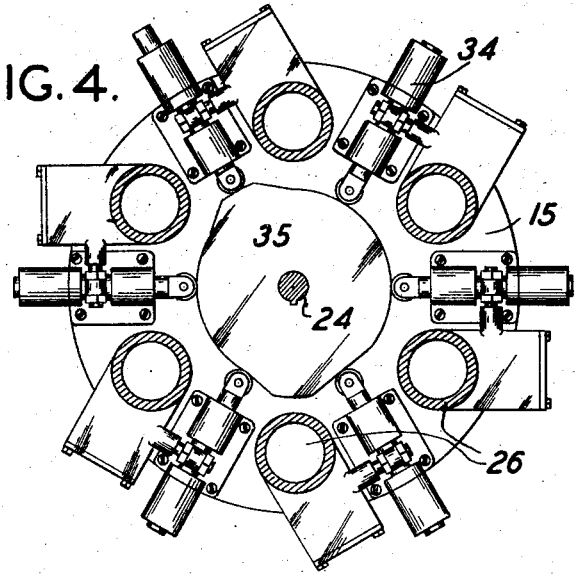
Figure 4 is a section on the line 4—4 of Fig. 1.

Carried centrally of the plate 10 is a footstep bearing 22 and similarly positioned in the plate 15 is a bearing 23, both bearings being preferably of the anti-friction type. Supported in these bearings is a shaft 24 which projects upwardly above the bearing 23 and carries at its upper end one member of a manually operable clutch 25. Seated in the upper ends of the bosses 21 are tube sections 26 connected at their upper ends by a plate 27 which is provided with a centrally disposed bearing 28 wherein is journalled a shaft carrying at its lower end the other member of the clutch 25 and at its upper end a bevel gear 29. Keyed on the shaft 24 just below the plate 15 is a valve plate 30 having its peripheral portion between the boss 17 and the upper ends of the bores 12. This valve plate is provided with a plurality of arcuate slots 31 positioned to successively register, as shown at the left of Fig. 2 and in Fig. 6, with the respective bores. Similarly there is keyed on the lower part of the shaft 24 a lower valve plate 32 having similarly spaced arcuate slots 33 successively registering with said bores 12 as shown in Fig. 7. Also, Figs. 6 and 7 disclosed simultaneous positions of these valve plates whereby it may be seen that the lower slots 33 are angularly displaced about the shaft 24 with respect to the upper slots 31.

Referring now to Figs. 5, 6 and 7 let it be supposed that the valve plate 30 is in the position shown. Then the left hand bore 12 will be open at its upper end to receive a carrier C which will pass down the bore and rest on the lower plate 32 which, in this position of the shaft, cuts off communication between the left hand bore 12 and the opening 18 alined therewith. If now the shaft 24 be revolved this carrier C will be permitted to drop through the slot 33 and the upper end of the bore 12 at the left will be closed. Each of the other tubes and bores are controlled in like manner and it is to be noted that not only do the plates 30 and 32 constitute valves for the carriers but they also constitute, when considered together, an automatic air lock between those sections of the tubes leading into this device and those leading out therefrom. Furthermore, the angular spacing of the slots and the number of slots in each plate together with the speed of rotation of the shaft 24 establish the minimum time interval between the passage of one carrier into a delivery tube and the passage of the succeeding carrier into that tube.

The tube sections 26 are preferably provided with carrier spacing mechanism indicated at 34 and including the controlling cam 35 and the stop pawls 36 which are in all respects of like character with those shown and described in the patent above referred to so that it is not thought necessary to here present a detailed description of the parts and operation of this feature although it is to be understood that this spacing mechanism prevents more than one carrier entering a respective bore or pocket at the same time and thus cooperates in the operation of the invention.

Further, the tubes may be provided, as set forth in said patent with lateral doors 37 and stops 38 so that, if from any cause the device ceases to function, carriers may be removed from the tubes and despatched by other suitable means, as for instance, by messengers.

The gear 29 is driven by any suitable means preferably with a continuous slow motion as by a suitably driven driving shaft 39 and gearing 40.

Obviously line tubes 41 may be connected to the arrangement shown in Figs. 1 and 2 at either or both ends so that it may be used at a sending station, at a receiving station or, especially on long lines, as a relay valve. This is clearly indicated in Fig. 8 which shows how the system may be blocked off as a closed tube system, a pressure source being provided close to the point of entry of the carriers into the respective sections and a vacuum source being provided close to the point at which the carriers leave the section. Fig. 9 illustrates the manner in which this multiple control or valve may be used in the transmission of carriers in both directions between stations. It is not deemed necessary to show all the combinations possible between stations as the device may be used in many tube arrangements. For instance, the tubes 41 leading from the multiple sending device in Fig. 8 may run to form two to six different stations and the tubes entering the multiple receiving device may lead from these or other stations, the relay being either omitted or put in at any desired place in one or both sets of tubes.

The invention is also of great utility in receiving carriers from several tubes and despatching them through a single tube as shown in Fig. 5 where it will be seen that the openings 18 are surrounded by a housing 42 of substantially inverted frusto-conical form terminating at its lower end in a connection 43 for a single tube. Within this housing is an inverted conical guide 44 to prevent carriers from cocking sidewise in the housing and the housing is provided with air openings 45 for the admission of pressure air. It will be plain that, since but one carrier at a time is discharged from the valve device, only one carrier can be in position to enter the tube leading from the connection 43.

It is obvious that minor changes may be made in the form and construction of the invention without departing from the material spirit thereof. It is not, therefore, desired to confine the invention to the exact form herein shown and described, but it is desired to include all such as properly come within the scope claimed.

We claim:

1. The combination with a plurality of pneumatic transmission tube lines and carriers therefor; of a valve device interposed in the lines of said tubes and including valve means on the intake side of the device to open and close communication between the tubes and the intake of said device, other valve means on the outlet side of the device to open and close communication between the device and the tube or tubes leading therefrom, and means to operate said valve means in succession.

2. The combination with multiple pneumatic transmission tube lines and carriers therefor; of a controlling device interposed in said lines and including multiple carrier receiving pockets each in alinement with a respective tube line, a valve at the inlet ends of said pockets to open and close communication between the pockets and incoming tube lines, a second valve at the outlet ends of said pockets to open and close communication between said pockets and outgoing tube lines, and means to actuate the valves to open first one end and then the other of each pocket.

3. The combination with multiple pneumatic transmission tube lines and carriers therefor; of a controlling device interposed in said lines and including multiple carrier receiving pockets each in alinement with a respective tube line, a valve at the inlet ends of said pockets to open and close communication between the pockets and incoming tube lines, a second valve at the outlet ends of said pockets to open and close communication between said pockets and outgoing tube lines, means to actuate the valves to open first one end and then the other of each pocket, and means to prevent a carrier from entering an occupied pocket.

4. The combination with multiple pneumatic transmission tube lines and carriers therefor; of a controlling device for said carriers interposed in said lines and having multiple carrier receiving pockets alined with said tube lines respectively, a shaft revolving centrally between said pockets, a valve disk carried by the shaft and extending over the inlet ends of said pockets and provided with a slot positioned for successive registration with said pockets, a second valve disk carried by the shaft and extending over the outlet ends of said pockets and provided with a slot positioned for successive registration with said pockets, the slot in one disk being angularly displaced with respect to the slot in the other disk, whereby each pocket has its ends opened at spaced intervals, and means to rotate said shaft.

5. The combination with multiple pneumatic transmission tube lines and carriers therefor; of a controlling device for said carriers interposed in said lines and having multiple carrier receiving pockets alined with said tube lines respectively, a shaft revolving centrally between said pockets, a valve disk carried by the shaft and extending over the inlet ends of said pockets and provided with a slot positioned for successive registration with said pockets, a second valve disk carried by the shaft and extending over the outlet ends of said pockets and provided with a slot positioned for successive registration with said pockets, the slot in one disk being angularly displaced with respect to the slot in the other disk, whereby each pocket has its ends opened at spaced intervals, means to rotate said shaft, and means to prevent a carrier from entering an occupied pocket.

6. The combination with multiple pneumatic transmission tube lines and carriers therefor; of a controlling device for said carriers interposed in said lines and having multiple carrier receiving pockets alined with said tube lines respectively, a shaft revolving centrally between said pockets, a valve disk carried by the shaft and extending over the inlet ends of said pockets and provided with a slot positioned for successive registration with said pockets, a second valve disk carried by the shaft and extending over the outlet ends of said pockets and provided with a slot positioned for successive registration with said pockets, the slot in one disk being angularly displaced with respect to the slot in the other disk, whereby each pocket has its ends opened at spaced intervals, means to rotate said shaft, and means to prevent a carrier from entering an occupied pocket and including a carrier spacing device in each line and a cam on said shaft actuating said devices in succession.

7. The combination with multiple pneumatic transmission tube lines and carriers therefor; of a controlling device for said carriers interposed in said lines and having multiple carrier receiving pockets alined with said tube lines respectively, a shaft revolving centrally between said pockets, a valve disk carried by the shaft and extending over the inlet ends of said pockets and provided with a slot positioned for successive registration with said pockets, a second valve disk carried by the shaft and extending over the outlet ends of said pockets and provided with a slot positioned for successive registration with said pockets, the slot in one disk being angularly displaced with respect to the slot in the other disk, whereby each pocket has its ends opened at spaced intervals, means to rotate said shaft, and means below the outlet ends of the pockets for conducting the carriers issuing therefrom to a single tube line.

In testimony whereof we affix our signatures.

WILLIAM V. McGUINNESS.
JOHN M. CHULSTROM.
WILLIAM H. FRANCIS.